US010992143B2

(12) United States Patent
Chen et al.

(10) Patent No.: US 10,992,143 B2

(45) Date of Patent: Apr. 27, 2021

(54) POWER BANK WITH A PLURALITY OF STACKED BATTERY MODULES

(71) Applicant: Gemtek Technology Co., Ltd., Hsinchu (TW)

(72) Inventors: Hung-Wen Chen, Hsinchu (TW); Wen-Yu Peng, Hsinchu (TW); Chih-Hsu Yen, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 424 days.

(21) Appl. No.: 15/920,471

(22) Filed: Mar. 14, 2018

(65) Prior Publication Data

US 2019/0131797 A1 May 2, 2019

(30) Foreign Application Priority Data

Oct. 31, 2017 (TW) ................................ 106216070

(51) Int. Cl.

| | |
|---|---|
| ***H02J 7/00*** | (2006.01) |
| ***H02J 7/14*** | (2006.01) |
| ***H01M 10/44*** | (2006.01) |
| ***H01M 10/42*** | (2006.01) |
| ***H01M 10/46*** | (2006.01) |
| ***H01M 50/20*** | (2021.01) |

(52) U.S. Cl.

CPC ....... *H02J 7/0013* (2013.01); *H01M 10/4257* (2013.01); *H01M 10/441* (2013.01); *H01M 10/46* (2013.01); *H01M 50/20* (2021.01); *H02J 7/0042* (2013.01); *H01M 2010/4271* (2013.01); *H01M 2220/10* (2013.01)

(58) Field of Classification Search

USPC .......................................................... 320/128

See application file for complete search history.

(56) References Cited

U.S. PATENT DOCUMENTS

| | | | | |
|---|---|---|---|---|
| 5,616,968 A * | 4/1997 | Fujii | H02J 9/062 | 307/66 |
| 6,469,901 B1 * | 10/2002 | Costner | G06F 1/18 | 361/730 |
| 2007/0252556 A1 * | 11/2007 | West | B60L 50/64 | 320/116 |
| 2009/0237012 A1 * | 9/2009 | Yokoyama | B25F 5/00 | 318/139 |
| 2009/0246616 A1 * | 10/2009 | Koyama | H01M 10/0413 | 429/153 |

(Continued)

*Primary Examiner* — Alexis B Pacheco

(74) *Attorney, Agent, or Firm* — Winston Hsu

(57) ABSTRACT

A power bank has a station and a plurality of battery modules. When the battery modules are stacked on the station, rechargeable batteries of the battery modules are electrically connected in parallel. When a charging port of the station is electrically connected to an external power supply, a charging-discharging control circuit of the station receives electric energy from the external power supply via the charging port and uses the received electric energy to charge the rechargeable batteries. When a discharging port of the station is electrically connected to an external electronic device, the charging-discharging control circuit transfers electric energy received from the rechargeable batteries to the external electronic device. Each of the battery modules is replaceable, and the total number of the battery modules of the power bank is adjustable.

6 Claims, 8 Drawing Sheets

(56) References Cited

U.S. PATENT DOCUMENTS

| | | | | |
|---|---|---|---|---|
| 2009/0296442 | A1* | 12/2009 | Chang | H02J 7/342 363/142 |
| 2012/0218211 | A1* | 8/2012 | McRae | H02J 7/025 345/173 |
| 2012/0286739 | A1* | 11/2012 | O'Brien, Jr. | H01M 2/1077 320/134 |
| 2013/0183562 | A1* | 7/2013 | Workman | H01M 2/1022 429/100 |
| 2015/0326060 | A1* | 11/2015 | Young | H02J 7/0077 320/108 |
| 2016/0302320 | A1* | 10/2016 | Kim | G06F 1/1698 |
| 2020/0059112 | A1* | 2/2020 | Langlois | H02J 7/025 |

* cited by examiner

POWER BANK WITH A PLURALITY OF STACKED BATTERY MODULES

BACKGROUND OF THE INVENTION

1. Field of the Invention

The present invention relates to a power bank, and more particularly, to a power bank with a plurality of stacked battery modules.

2. Description of the Prior Art

A wide variety of modern portable electronic devices, such as laptops, tablets, mobile phones, MP3 players and the like, rely on batteries to provide electric power when used outdoors. Therefore, the user must charge the battery of the portable electronic device before going out and needs to carry multiple batteries for prolonged usage, thus it is very inconvenient. In order to solve this problem, power banks are used. Once the user finishes charging the power bank, the power bank can be used to charge the portable electronic device when the user goes out. However, a current rated capacity of a power bank is mostly fixed, and the user cannot change the rated capacity of the power bank. When a user only briefly walks out but only has a power bank with a large capacity, the large-capacity power bank has a relatively heavy weight and thus causes inconvenience to the user.

SUMMARY OF THE INVENTION

An embodiment of the present invention provides a power bank. The power bank comprises M battery modules and a station. M is an integer greater than one. Each battery module comprises a first housing, a control circuit, a rechargeable battery, a first contact, a second contact, a third contact, and a fourth contact. The control circuit is disposed in the first housing for controlling operations of each battery module. The rechargeable battery is disposed in the first housing and electrically connected to the control circuit. The third contact is electrically connected to the first contact. The fourth contact is electrically connected to the second contact. The station comprises a second housing, a first main contact, a second main contact, a charging port, a discharging port, and a charging-discharging control circuit. The first main contact is electrically connected to a first contact of a first battery module of the M battery modules. The second main contact is electrically connected to the second contact of the first battery module of the M battery modules. The charging-discharging control circuit is disposed in the second housing and electrically connected to the first main contact, the second main contact, the charging port and the discharging port. A third contact of an $N^{th}$ battery module of the M battery modules is electrically connected to a first contact of an $N+1^{th}$ battery module, a fourth contact of the $N^{th}$ battery module is electrically connected to a second contact of the $N+1^{th}$ battery module, and N is an integer greater than zero and smaller than M. When the charging port is electrically connected to a power supply, the charging-discharging control circuit receives electric power from the power supply through the charging port and charges the rechargeable battery of each battery module via the first contact, the second contact, the third contact and the fourth contact of each battery module. When the discharging port is electrically connected to an electronic device, the charging-discharging control circuit provides electric power to the electronic device via the discharging port.

Another embodiment of the present invention provides a power bank. The power bank comprises M battery modules. M is an integer greater than one. Each battery module comprises a housing, a rechargeable battery, a first contact, a second contact, a third contact, a fourth contact, a charging port, a discharging port, and a charging-discharging control circuit. The rechargeable battery is disposed in the housing. The third contact is electrically connected to the first contact. The fourth contact is electrically connected to the second contact. The charging-discharging control circuit is disposed in the housing and electrically connected to the rechargeable battery, the first contact, the second contact, the third contact, the fourth contact, the charging port and the discharging port. A third contact of an $N^{th}$ battery module of the M battery modules is electrically connected to a first contact of an $N+1^{th}$ battery module, a fourth contact of the $N^{th}$ battery module is electrically connected to a second contact of the $N+1^{th}$ battery module, and N is an integer greater than zero and smaller than M. When a charging port of a first randomly selected battery module of the M battery modules is electrically connected to a power supply, a charging-discharging control circuit of the first randomly selected battery module receives electric power from the power supply and charges the rechargeable battery of each battery module via the first contact, the second contact, the third contact and the fourth contact of each battery module. When a discharging port of a second randomly selected battery module of the M battery modules is electrically connected to an electronic device, a charging-discharging control circuit of the second randomly selected battery module provides electric power to the electronic device via the discharging port of the second randomly selected battery module.

Another embodiment of the present invention provides another power bank. The power bank comprises a pancake-shaped housing, a control circuit, a rechargeable battery, a charging port and a discharging port. The control circuit is positioned in the pancake-shaped housing, and configured to control operations of the power bank. The rechargeable battery is positioned in the pancake-shaped housing and electrically connected to the control circuit. The charging port is exposed from a first opening of the pancake-shaped housing and electrically connected to the control circuit. When the charging port is electrically connected to a power supply, the control circuit utilizes electric power of the power supply to charge the rechargeable battery. The discharging port is exposed from a second opening of the pancake-shaped housing and electrically connected to the control circuit. When the discharging port is electrically connected to an electronic apparatus, the control circuit provides electric power received from the rechargeable battery to the electronic apparatus via the discharging port.

Since a plurality of battery modules can be stacked and electrically connected in parallel, a user can stack an appropriate number of battery modules as needed to assemble a desired power bank. Each battery module can be replaced, and the total number of the battery modules can be adjusted according to the user's actual needs. As a result, users will be more flexible and convenient in using the power bank.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
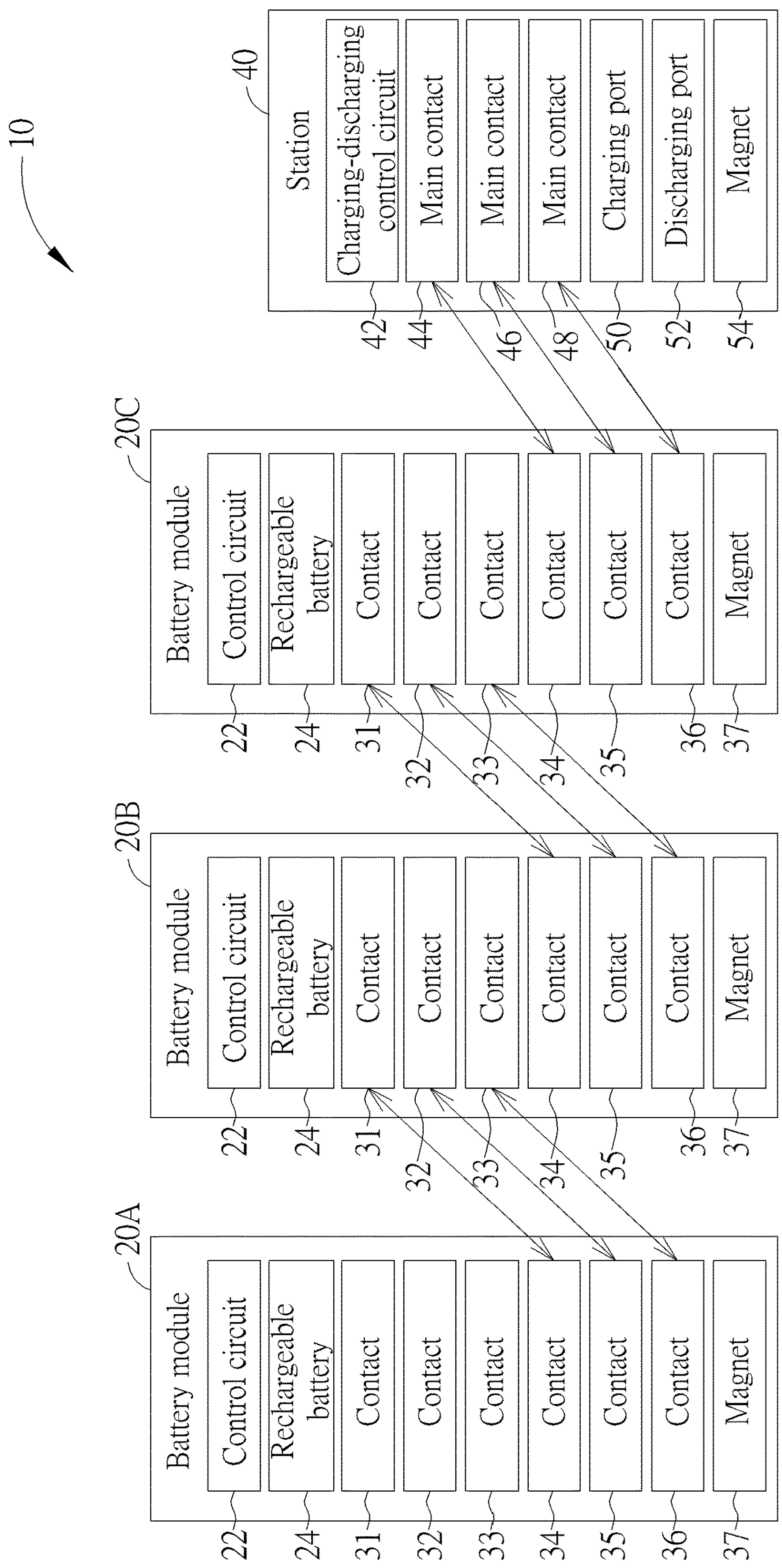
FIG. 1 is a functional block diagram of a power bank according to an embodiment of the present invention.
Figure 2:
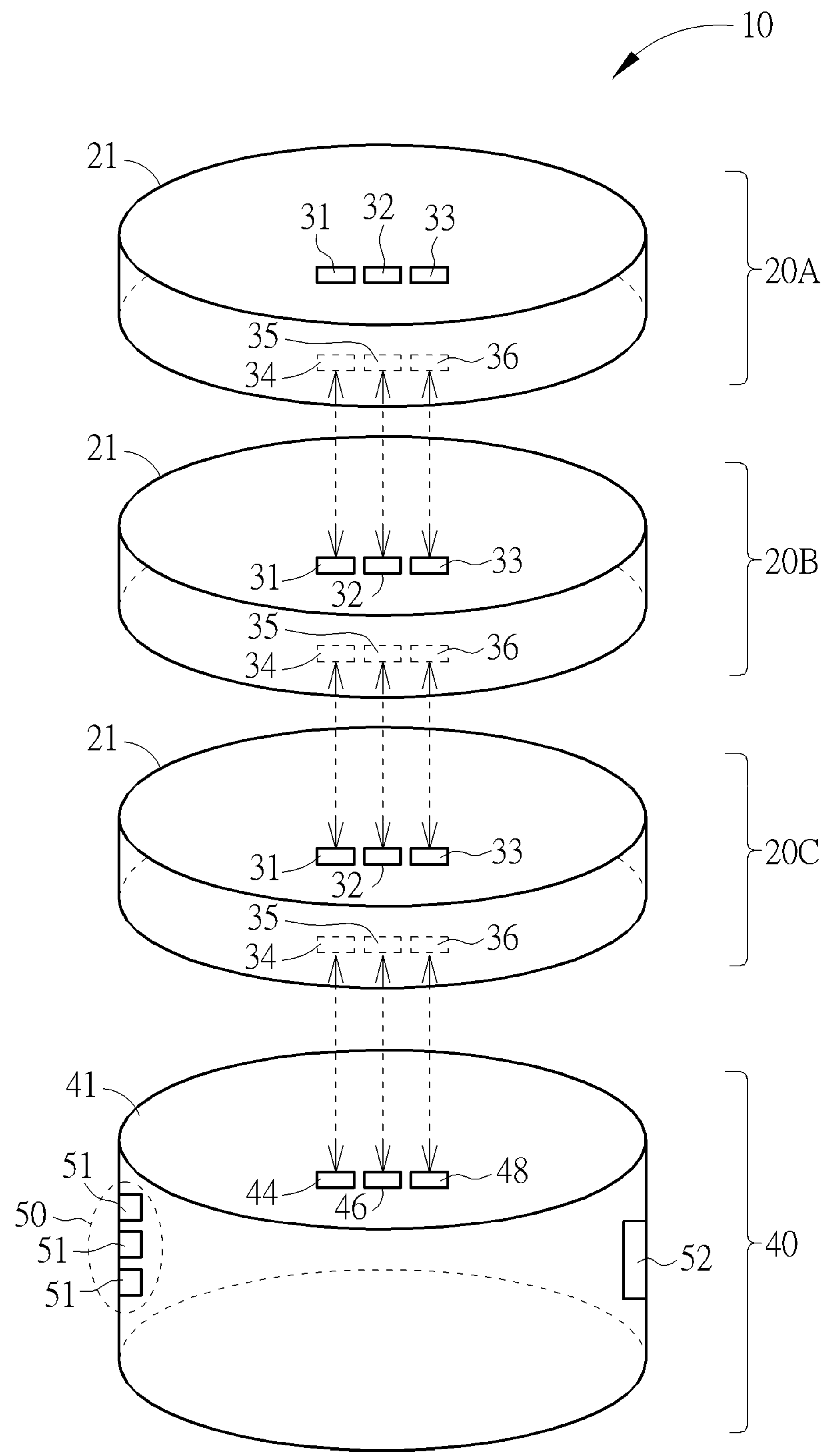
FIG. 2 shows the assembly of the power bank shown in FIG. 1.
Figure 3:
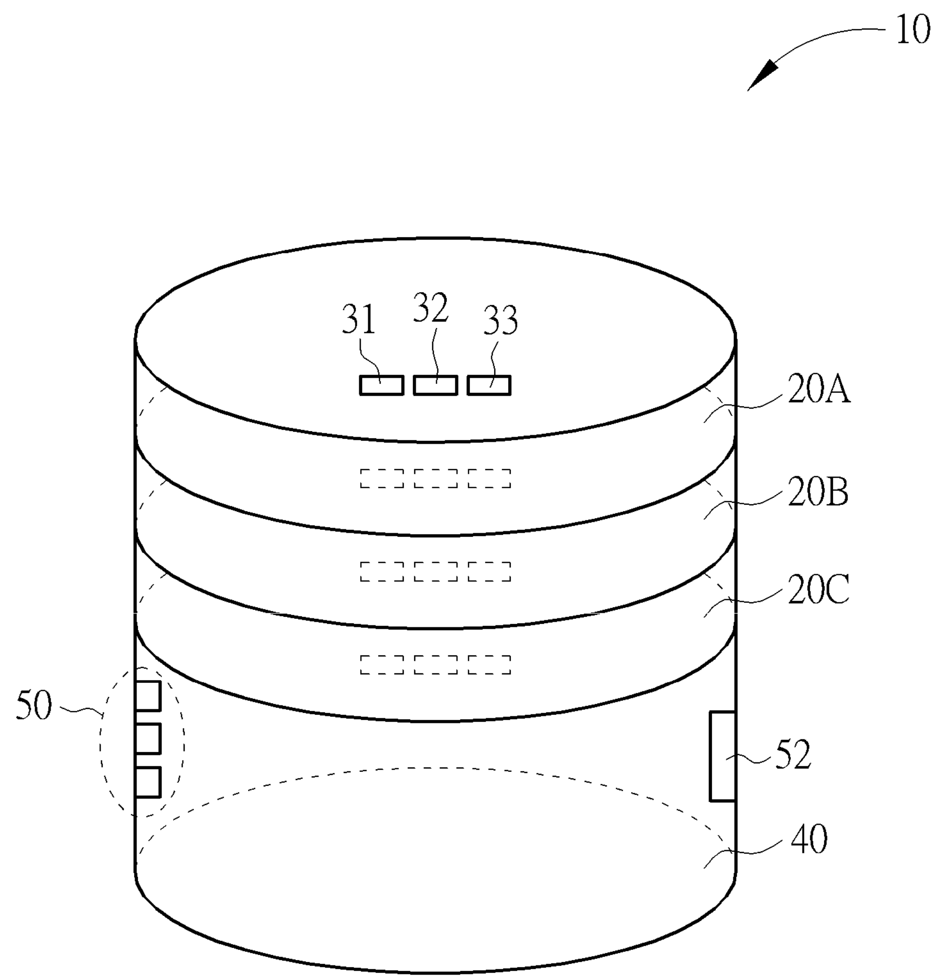
FIG. 3 is a perspective view of the power bank shown in FIG. 1.

Please refer to FIG. 1 to FIG. 3. FIG. 1 is a functional block diagram of a power bank 10 according to an embodiment of the present invention. FIG. 2 shows the assembly of the power bank 10 shown in FIG. 1. FIG. 3 is a perspective view of the power bank 10 shown in FIG. 1. The power bank 10 has a plurality of battery modules 20A to 20C and a station 40. Each of the battery modules 20A to 20C has a housing 21, a control circuit 22, a rechargeable battery 24, and six contacts 31 to 36. The control circuit 22 is disposed in the housing 21 and configured to control the operations of the battery module 20A, 20B or 20C. The rechargeable battery 24 is disposed in the housing 21 and electrically connected to the control circuit 22 for storing electric energy. In addition, in the same battery module 20A, 20B or 20C, the contact 31 is electrically connected to the contact 34, the contact 32 is electrically connected to the contact 35, and the contact 33 is electrically connected to the contact 36. The contacts 31, 32, and 33 are disposed on the same side of the housing 21, and the contacts 34, 35, and 36 are disposed on another side of the housing 21.

In addition, the battery modules 20A to 20C may be stacked together such that the three rechargeable batteries 24 of the battery modules 20A to 20C are electrically connected in parallel. When the battery modules 20A to 20C are stacked, the contacts 34, 35 and 36 of the battery module 20A are respectively electrically connected to the contacts 31, 32 and 33 of the battery module 20B, and the contacts 34, 35 and 36 of the battery module 20B are respectively electrically connected to the contacts 31, 32 and 33 of the battery module 20C. In addition, the station 40 has a housing 41, three main contacts 44, 46, and 48, a charging port 50, a discharging port 52, and a charging-discharging control circuit 42. When the battery module 20C is disposed on the station 40, the main contacts 44, 46 and 48 are respectively electrically connected to the contacts 34, 35 and 36 of the battery module 20C. The rated capacity of each rechargeable battery 24 can be ranged from 300 mAh (milliampere hours) to 500 mAh, making the power bank 10 easily portable.

In the embodiment, the main contact 44 and the contacts 31 and 34 are used to transmit a positive voltage during charging and discharging. The main contact 46 and the contacts 32 and 35 are used to transmit a negative voltage during charging and discharging. Moreover, the main contact 48 and the contacts 33 and 36 are used as ground terminals. However, in one embodiment of the present invention, the main contact 48 and the contacts 33 and 36 may be omitted.

When the battery modules 20A to 20C are stacked on the station 40, the charging-discharging control circuit 42 of the station 40 may charge/discharge the rechargeable batteries 24 of the battery modules 20A, 20B and 20C via the main contacts 44, 46 and 48 and the contacts 34, 35 and 36. In detail, when the charging port 50 of the station 40 is electrically connected to an external power supply, the charging-discharging control circuit 42 receives electric power from the external power supply via the charging port 50 and charges the rechargeable battery 24 of each of the battery modules 20A, 20B, and 20C via the main contacts 44, 46 and 48 and the contacts 31 to 36 of the battery modules 20A to 20C. In addition, when the discharging port 52 of the station 40 is electrically connected to an external electronic device, the charging-discharging control circuit 42 can provide electric power to the external electronic device via the discharging port 52. In detail, if the charging port 50 is not electrically connected to a power supply, when the discharging port 52 is electrically connected to an external electronic device, the charging-discharging control circuit 42 receives electric power from the rechargeable batteries 24 of the battery modules 20A, 20B and 20C via the contacts 31 to 36 of the battery modules 20A to 20C and the main contacts 44, 46 and 48 so as to provide the received electric power to the external electronic device via the discharging port 52. In addition, if the charging port 50 is electrically connected to an external power supply, when the discharging port 52 is electrically connected to an external electronic device, the charging-discharging control circuit 42 can directly transfer electric power received from the external power supply to the external electronic device.

In the above embodiment, the power bank 10 has three battery modules 20A to 20C. However, the total number of the battery modules in the power bank 10 of the present invention is not limited to three, but may be other integer. In detail, in an embodiment of the present invention, the power bank 10 has M battery modules identical to the battery modules 20A, 20B or 20C, and M is an integer greater than one. When the M battery modules are stacked, the main contacts 44, 46 and 48 of the station 40 are respectively electrically connected to the contacts 34, 35 and 36 of the first battery module (such as the battery module 20C) of the M battery modules, and the contacts 31, 32 and 33 of an $N^{th}$ battery module of the M battery modules are respectively electrically connected to the contacts 34, 35 and 36 of an $N+1^{th}$ battery module of the M battery modules. N is an integer greater than zero and less than M.

In addition, in the embodiment, the charging port 50 may have three pogo pins 51, which respectively serve as a positive voltage terminal, a negative voltage terminal, and a ground terminal. In addition, the discharging port 52 may be a universal serial bus (USB) port. In another embodiment of the present invention, each of the charging port 50 and the discharging port 52 may be a USB port. In addition, in another embodiment of the present invention, each of the battery modules 20A to 20C may respectively have at least a magnet 37, and the station 40 may have a magnet 54, such that the battery modules 20A to 20C and the station 40 may combine with each other by magnetic force. For example, the battery modules 20A and 20B may be magnetically coupled through the respective magnets 37. The battery modules 20B and 20C may be magnetically coupled via the respective magnets 37. The battery module 20C and the station 40 may be magnetically coupled through the respective magnets 37 and 54. In addition, each of the battery modules 20A to 20C has a circular pie shape, but the present invention is not limited thereto.

Figure 4:
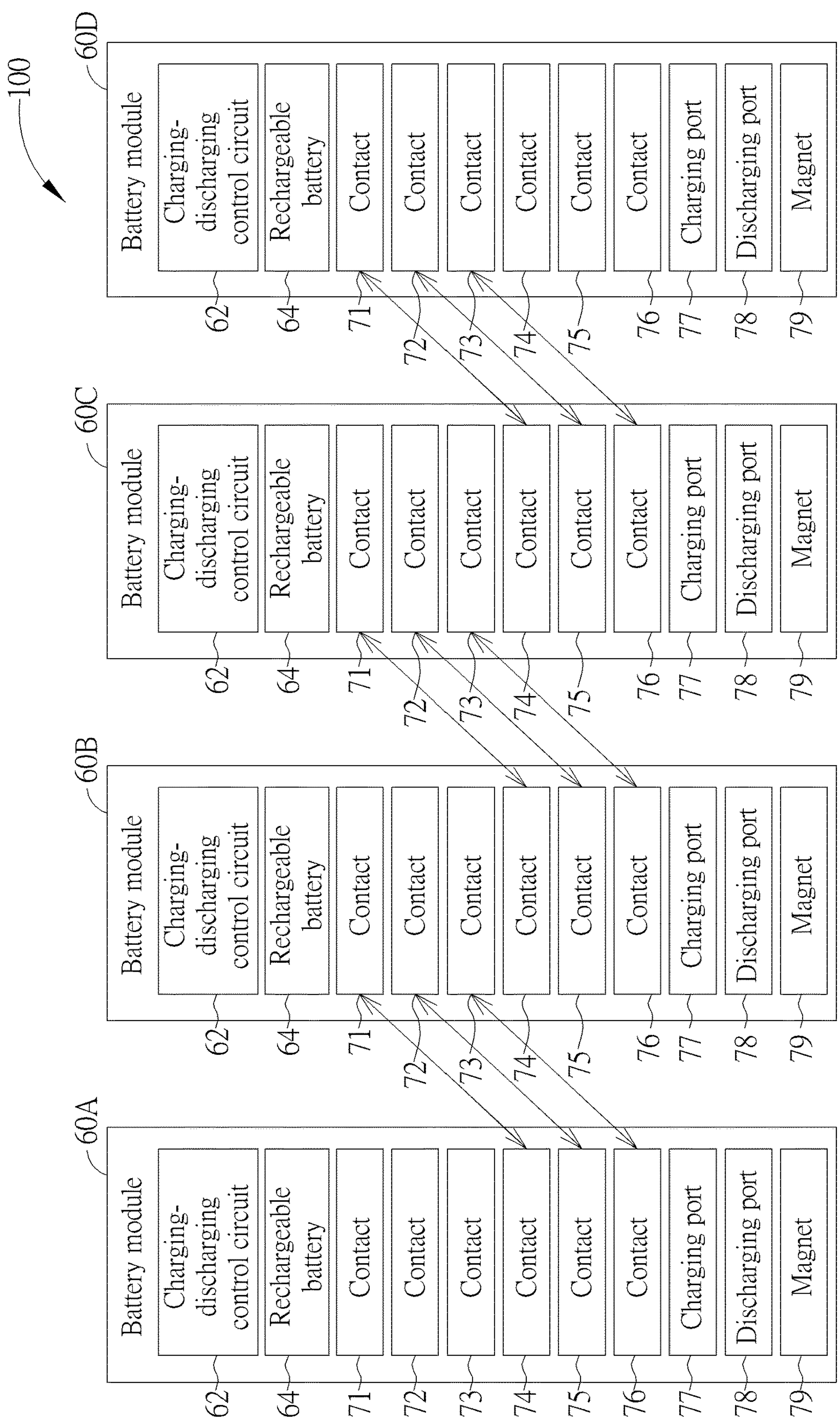
FIG. 4 is a functional block diagram of another power bank according to an embodiment of the present invention.
Figure 5:
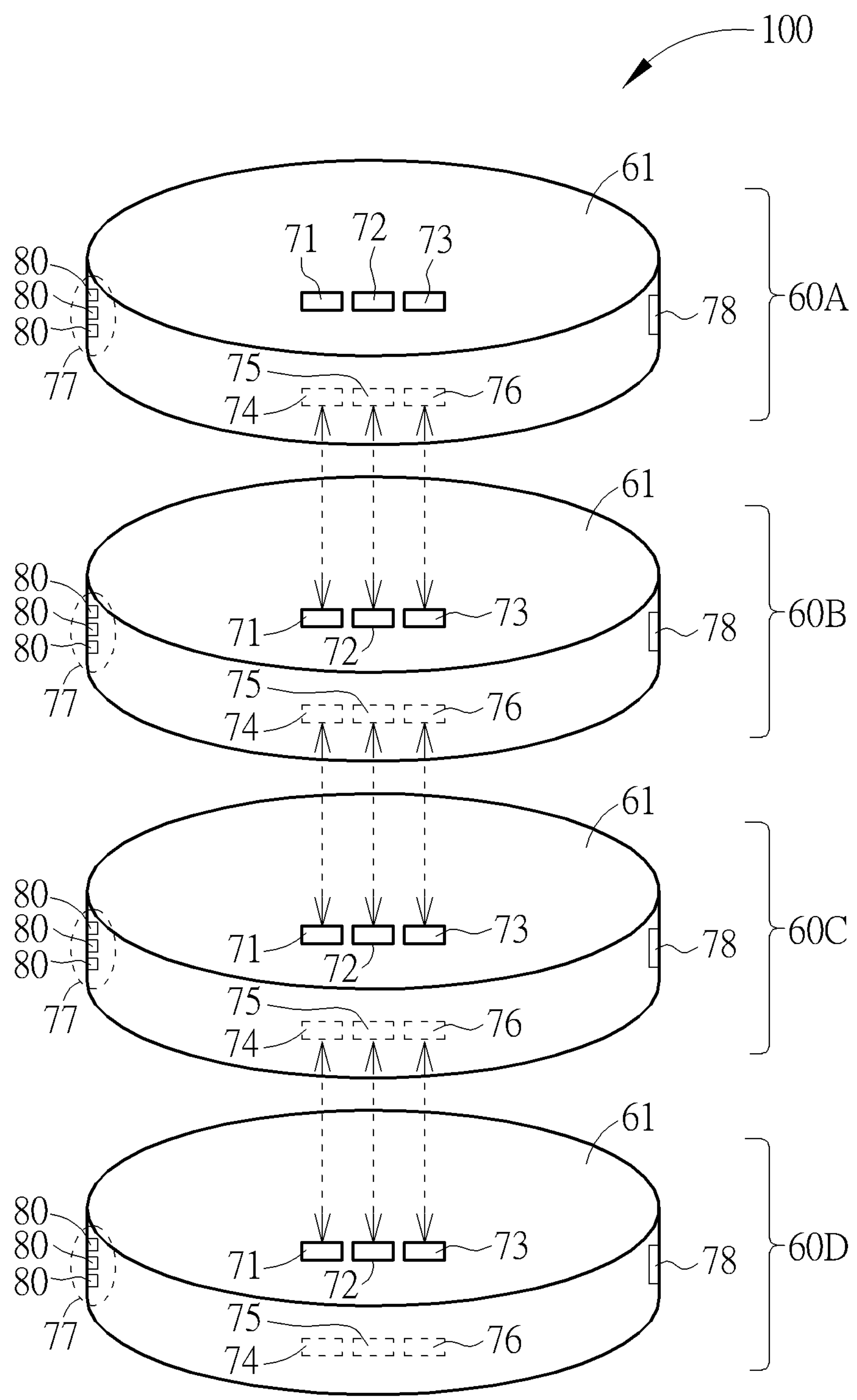
FIG. 5 shows the assembly of the power bank shown in FIG. 4.
Figure 6:
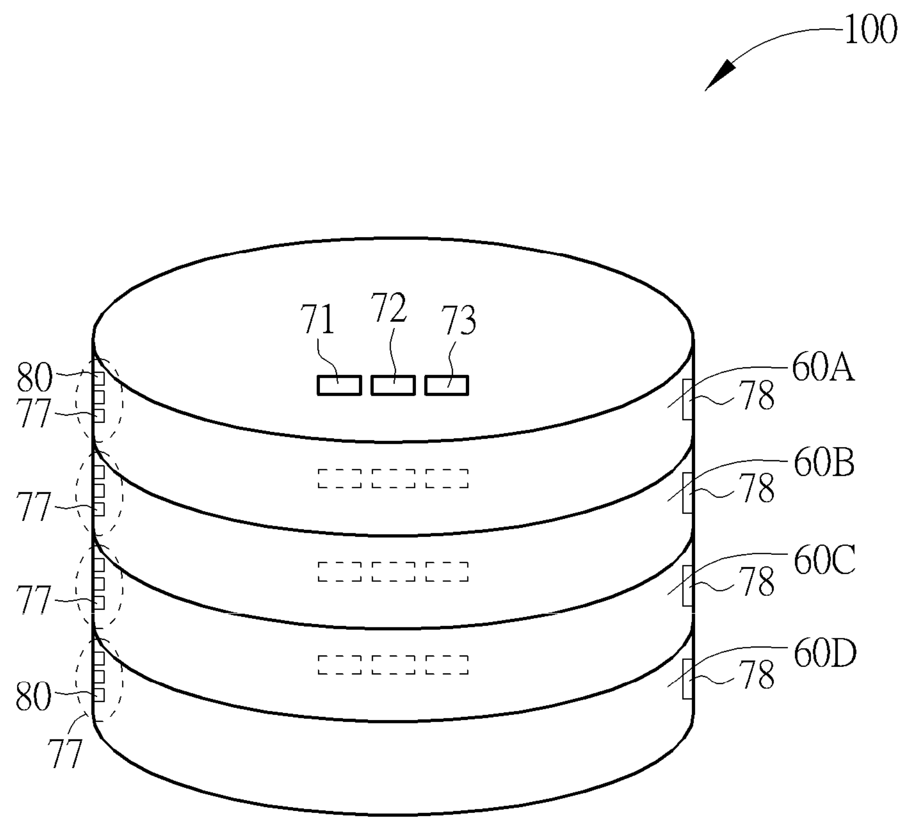
FIG. 6 is a perspective view of the power bank shown in FIG. 4.

In another embodiment of the present invention, a power bank may not necessarily have the station 40, and each battery module may operate independently and may be electrically connected in parallel. Please refer to FIG. 4 to FIG. 6. FIG. 4 is a functional block diagram of another power bank 100 according to another embodiment of the present invention. FIG. 5 shows the assembly of the power bank 100 shown in FIG. 4. FIG. 6 is a perspective view of the power bank 100 shown in FIG. 4. The power bank 100 has a plurality of battery modules 60A to 60D. Each of the battery modules 60A to 60D has a housing 61, a charging-discharging control circuit 62, a rechargeable battery 64, contacts 71 to 76, a charging port 77, and a discharging port 78. The charging-discharging control circuit 62 controls the operations of the battery module 60A, 60B, 60C or 60D. The rechargeable battery 64, the contacts 71 to 76, the charging port 77 and the discharging port 78 are electrically connected to the charging-discharging control circuit 62. The rechargeable battery 64 is disposed in the housing 61 for storing electric energy. In the same battery module 60A to 60D, the contacts 71, 72 and 73 are respectively electrically connected to the contacts 74, 75 and 76. The contacts 71, 72 and 73 are disposed on the same side of the housing 61, and the contacts 74, 75 and 76 are disposed on the other side of the housing 61.

In addition, the battery modules 60A to 60D may be stacked such that the four rechargeable batteries 64 of the battery modules 60A to 60D are electrically connected in parallel. When the battery modules 60A to 60D are stacked, the contacts 74, 75 and 76 of the battery module 60A are respectively electrically connected to the contacts 71, 72 and 73 of the battery module 60B, the contacts 74, 75 and 76 of the battery module 60B are respectively electrically connected to the contacts 71, 72 and 73 of the battery module 60C, and the contacts 74, 75 and 76 of the battery module 60C are respectively electrically connected to the contacts 71, 72 and 73 of the battery module 60D.

In the present embodiment, the contacts 71 and 74 transmit a positive voltage during charging and discharging, the contacts 72 and 75 transmit a negative voltage during charging and discharging, and the contacts 73 and 76 serve as ground terminals. However, in one embodiment of the present invention, the contacts 73 and 76 used as the ground terminals may be omitted.

When the battery modules 60A to 60D are stacked in the above manner, the charging port 77 of any one of the battery modules 60A, 60B, 60C and 60D can be used to receive electric power from an external power supply, and the discharging port 78 of any one of the battery modules 60A, 60B, 60C and 60D can be used to output electric power stored in the rechargeable battery 64 of each of the battery modules 60A, 60B, 60C and 60D. For example, when the charging port 77 of the battery module 60B is electrically connected to the external power supply, the charging-discharging control circuit 62 of the battery module 60B receives electric power from the external power supply via the charging port 77 of the battery module 60B and charges the rechargeable battery 24 of each of the battery modules 60A, 60B, 60C and 60D via the contacts 71 to 76 of each of the battery modules 60A, 60B, 60C and 60D. For another example, when the discharging port 78 of the battery module 60C is electrically connected to an external electronic device, the charging-discharging control circuit 62 of the battery module 60C supplies electric power to the external electronic device via the discharging port 78 of the battery module 60C. In detail, if all of the charging ports 77 are not electrically connected to the power supply, when any one of the discharging ports 78 is electrically connected to an external electronic device, the corresponding charging-discharging control circuit 62 can receive electric power from the rechargeable battery 64 of each of the battery modules 60A to 60D via the contacts 71 to 76 of the battery modules 60A to 60D, and provide the received electric power to the external electronic device via the discharging port 78 electrically connected to the external electronic device. In addition, if one of the charging ports 77 is electrically connected to an external power supply, when the discharging port 78 is electrically connected to an external electronic device, the corresponding charging-discharging control circuit 62 may directly transfer electric power received from the external power supply to the external electronic device via the charging port 77, which is electrically connected to the external power supply, and the discharging port 78, which is electrically connected to the external electronic device.

In the above embodiment, the power bank 100 has four battery modules 60A to 60D. However, the total number of the battery modules of the power bank 100 according to the present invention is not limited to four, but may be other Integer. In detail, in an embodiment of the present invention, the power bank 100 has M battery modules identical to the battery modules 60A, 60B, 60C and 60D, and M is an integer larger than one. When the M battery modules are stacked, the contacts 71, 72 and 73 of an $N^{th}$ battery module of the M battery modules are respectively electrically connected to the contacts 74, 75 and 76 of an $N+1^{th}$ battery module of the M battery modules, where N is an integer greater than zero and less than M.

In addition, in this embodiment, the charging port 77 may have three pogo pins 80 respectively serving as a positive voltage terminal, a negative voltage terminal, and a ground terminal. Furthermore, the discharging port 78 may be a universal serial bus (USB) port. In another embodiment of the present invention, each of the charging port 77 and the discharging port 78 is a USB port. In another embodiment of the present invention, each of the battery modules 60A to 60D may respectively have at least a magnet 79 for magnetically combining with other battery modules. For example, the battery modules 60A and 60B are magnetically coupled via their respective magnets 79, the battery modules 60B and 60C are magnetically coupled via their respective magnets 79, and the battery modules 60C and 60D are magnetically coupled via their respective magnets 79. In addition, each of the battery modules 60A to 60D has a circular pie shape, but the present invention is not limited thereto.

Figure 7:
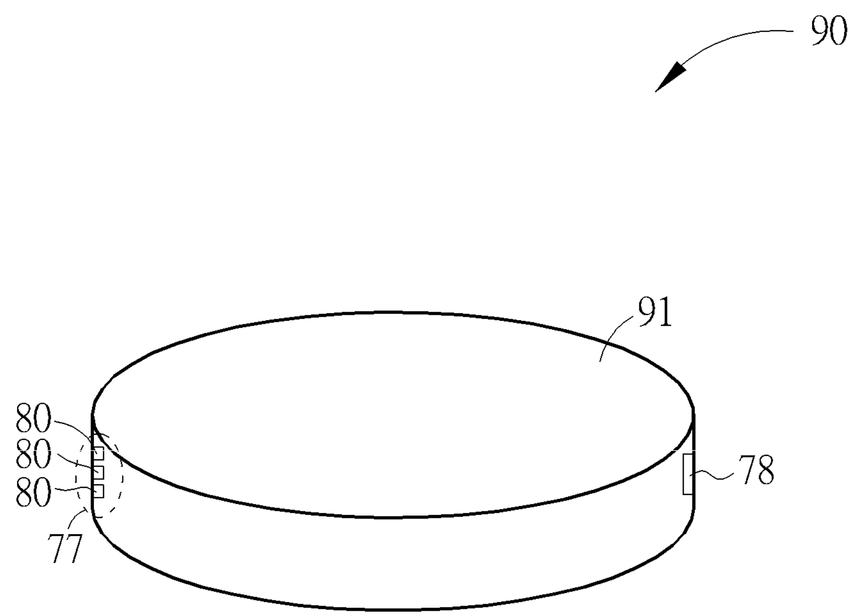
FIG. 7 is a perspective view of a power bank according to another embodiment of the present invention.
Figure 8:
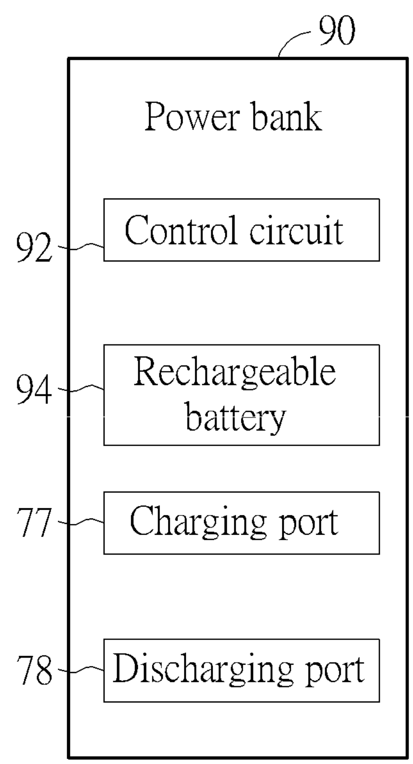
FIG. 8 is a functional block diagram of the power bank shown in FIG. 7.

Please refer to FIG. 7 and FIG. 8. FIG. 7 is a perspective view of a power bank 90 according to another embodiment of the present invention. FIG. 8 is a functional block diagram of the power bank 90 shown in FIG. 7. The power bank 90 has a pancake-shaped housing 91, a control circuit 92, a rechargeable battery 94, a charging port 77, and a discharging port 78. The control circuit 92 is disposed in the housing 91 for controlling the operations of the power bank 90. The rechargeable battery 94 is disposed in the housing 91 and electrically connected to the control circuit 92 for storing electric energy. The housing 91 has openings for exposing the charging port and the discharging port 78. The charging port 77 and the discharging port 78 are electrically connected to the control circuit 94. When the charging port 77 is electrically connected to the external power supply, the control circuit 92 charges the rechargeable battery 94 with the power of the external power supply. In addition, when the discharging port 78 is electrically connected to the external electronic device, the control circuit 92 supplies electric power received from the rechargeable battery 94 to the external electronic device via the discharging port 78. In an embodiment of the present invention, the charging port 77 may have a plurality of pogo pins 80 for electrically connecting to an external power supply. The discharging port 78 may be a USB port. In addition, the rechargeable battery 94 may have a rated capacity of 300 mAh (milliampere hours) to 500 mAh, which makes the power bank 90 easily portable.

In view of the foregoing embodiments, since a plurality of battery modules can be stacked and electrically connected in parallel, a user may stack an appropriate number of battery modules according to actual needs so as to assemble a required power bank. Each battery module can be replaced, and the total number of battery modules can be adjusted according to the user's actual needs. As a result, users will be more flexible and convenient in using power bank. In addition, the present invention also provides a pancake-shaped power bank with a smaller rated capacity for convenient carrying.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power bank, comprising:

M battery modules electrically connected in parallel, M being an integer greater than one, each battery module comprising:

a housing;

a rechargeable battery disposed in the housing;

a first contact disposed on a first surface of the housing, and configured to transmit a first voltage;

a second contact disposed on the first surface of the housing, and configured to transmit a second voltage less than the first voltage;

a third contact disposed on a second surface of the housing and electrically connected to the first contact to transmit the first voltage; and a fourth contact disposed on the second surface of the housing and electrically connected to the second contact to transmit the second voltage;

a charging port;

a discharging port; and a charging-discharging control circuit disposed between the first surface and the second surface, and electrically connected to the rechargeable battery, the first contact, the second contact, the third contact, the fourth contact, the charging port and the discharging port;

wherein when an $N^{th}$ battery module of the M battery modules is disposed on a first surface of a housing of an $N+1^{th}$ battery module of the M battery modules, a third contact of the $N^{th}$ battery module is electrically connected to a first contact of the $N+1^{th}$ battery module, a fourth contact of the $N^{th}$ battery module is electrically connected to a second contact of the $N+1^{th}$ battery module, and N is an integer greater than zero and smaller than M;

wherein when a charging port of a first randomly selected battery module of the M battery modules is electrically connected to a power supply, a charging-discharging control circuit of the first randomly selected battery module receives electric power from the power supply and charges the rechargeable battery of the each battery module via the first contact, the second contact, the third contact and the fourth contact of the each battery module; and wherein when a discharging port of a second randomly selected battery module of the M battery modules is electrically connected to an electronic device, a charging-discharging control circuit of the second randomly selected battery module provides electric power to the electronic device via the discharging port of the second randomly selected battery module.

2. The power bank of claim 1, wherein when the discharging port is electrically connected to the electronic device, the charging-discharging control circuit receives electric power from rechargeable batteries of the M battery modules via the first contact, the second contact, the third contact and the fourth contact of the each battery module and provides the electric power received from the rechargeable batteries to the electronic device via the discharging port.

3. The power bank of claim 1, wherein the charging port comprises a plurality of pogo pins for electrically connecting to the power supply, and the discharging port is a universal serial bus (USB) port.

4. The power bank of claim 1, wherein the charging port and the discharging port are universal serial bus (USB) ports.

5. The power bank of claim 1, wherein each of the battery modules has a circular pie shape.

6. The power bank of claim 1, wherein the each battery module further comprises a magnet for combining with other battery modules by magnetic force.

* * * * *